US008606500B2

(12) United States Patent
Veliu et al.

(10) Patent No.: US 8,606,500 B2
(45) Date of Patent: Dec. 10, 2013

(54) METHOD AND DEVICE FOR DEMONSTRATING FEATURES OF A VEHICLE NAVIGATION SYSTEM

(75) Inventors: Shpetim S. Veliu, Livonia, MI (US); Christopher L. Oesterling, Troy, MI (US); Hitan S. Kamdar, Macomb, MI (US); Ronald W. Fraser, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 2573 days.

(21) Appl. No.: 11/420,620

(22) Filed: May 26, 2006

(65) Prior Publication Data

US 2007/0276584 A1    Nov. 29, 2007

(51) Int. Cl.
*G01C 21/00* (2006.01)
(52) U.S. Cl.
USPC ............................................. 701/408
(58) Field of Classification Search
USPC ............................................. 701/200
See application file for complete search history.

(56) References Cited

U.S. PATENT DOCUMENTS

| | | | | |
|---|---|---|---|---|
| 5,610,822 A | * | 3/1997 | Murphy | 701/211 |
| 5,987,381 A | | 11/1999 | Oshizawa | |
| 6,064,322 A | * | 5/2000 | Ohira | 340/995.18 |
| 6,289,276 B1 | * | 9/2001 | Ahrens et al. | 701/200 |
| 6,421,607 B1 | | 7/2002 | Gee et al. | |
| 6,456,933 B1 | | 9/2002 | Hessing | |
| 6,553,308 B1 | | 4/2003 | Uhlmann et al. | |
| 2002/0010542 A1 | * | 1/2002 | Ahrens et al. | 701/200 |
| 2003/0236818 A1 | | 12/2003 | Bruner et al. | |
| 2005/0055155 A1 | | 3/2005 | Mafune | |
| 2005/0125149 A1 | | 6/2005 | Tada | |
| 2005/0149253 A1 | | 7/2005 | Nambata | |
| 2005/0171686 A1 | | 8/2005 | Davis | |
| 2006/0015249 A1 | | 1/2006 | Gieseke | |
| 2006/0069503 A1 | | 3/2006 | Suomela et al. | |
| 2006/0116816 A1 | | 6/2006 | Chao et al. | |
| 2006/0161343 A1 | | 7/2006 | Agnew et al. | |
| 2007/0005233 A1 | * | 1/2007 | Pinkus et al. | 701/200 |
| 2007/0027625 A1 | * | 2/2007 | Kamdar et al. | 701/213 |
| 2007/0143018 A1 | | 6/2007 | Murlidar et al. | |
| 2007/0150179 A1 | * | 6/2007 | Pinkus et al. | 701/208 |
| 2007/0225902 A1 | * | 9/2007 | Gretton et al. | 701/202 |
| 2008/0046174 A1 | | 2/2008 | Johnson | |
| 2008/0114533 A1 | | 5/2008 | Weiss et al. | |

FOREIGN PATENT DOCUMENTS

| | | | | | |
|---|---|---|---|---|---|
| JP | 2001021373 A | * | 1/2001 | | G01C 21/00 |
| JP | 2001147130 A | * | 5/2001 | | G01C 21/00 |

* cited by examiner

*Primary Examiner* — Shelley Chen
(74) *Attorney, Agent, or Firm* — Anthony Luke Simon; Reising Ethington P.C.

(57) ABSTRACT

A demonstration method and module for demonstrating various features of a vehicle navigation system without activating the system at a back-end facility, such as a remote call center. The demonstration module comes with a variety of pre-established navigation demonstrations, each of which is designed for a particular geographic area. The demonstration module obtains a vehicle position reading from the vehicle navigation system, and then utilizes this reading to select the most appropriate demonstration experience for that area. The selected navigation demonstration is then played through one or more output devices in the vehicle, such as speakers and a graphical display. This enables a prospective customer to experience a local or familiar navigation demonstration, without taking the steps and incurring the expenses associated with activating the vehicle navigation system at the call center.

15 Claims, 3 Drawing Sheets

METHOD AND DEVICE FOR DEMONSTRATING FEATURES OF A VEHICLE NAVIGATION SYSTEM

TECHNICAL FIELD

The present invention generally relates to vehicle navigation systems and, more particularly, to methods for demonstrating features of vehicle navigation systems to prospective customers without activating the systems at a back-end facility, such as a call center.

BACKGROUND OF THE INVENTION

Today's vehicles offer an ever-increasing array of services and products that enhance the driving experience and increase passenger safety. Turn-by-turn directions, airbag deployment notifications, various infotainment products, and voice and data communications are but a few examples.

One type of vehicle system that provides such services and products is based on telematics. In general, telematics-based systems utilize a combination of wireless voice and data technologies to communicate between vehicle-installed hardware and a remote back-end facility, such as a call center. Most telematics-based systems require some type of account activation or registration before the telematics-based system will provide services to the vehicle hardware, however, such activation typically costs money and takes time to perform.

Furthermore, it is not uncommon for a prospective customer to encounter a vehicle with a telematics-based system, such a navigation system, that is either inactive or that is not configured to take advantage of the complete set of telematics-based services being offered. For instance, telematics-based systems in new vehicles are typically not activated by the manufacturer, while those in used vehicles are oftentimes deactivated by the previous owner so that they do not have to continue paying for services. Moreover, even if activated, subscribers oftentimes sign up for less than the whole bundle of offered services, and some services are only accessible while the vehicle is being operated.

Because telematics-based services can have an impact on a prospective customer's purchasing decision, in-vehicle demonstrations are highly desirable, as opposed to other forms of less hands-on demonstrations, such as video presentations.

SUMMARY OF THE INVENTION

According to one aspect of the present invention, there is provided a method for demonstrating features of a vehicle navigation system. The demonstration method generally comprises the steps of: (a) providing a plurality of navigation demonstrations, each of which is generally directed to a geographic location; (b) obtaining a vehicle position reading; (c) selecting one of the navigation demonstrations based at least partially on the vehicle position reading; and (d) using one or more output devices to play the selected navigation demonstration and thereby illustrate features of the vehicle navigation system.

According to another aspect of the present invention, there is provided an electronic demonstration module that is used with a vehicle navigation system. The demonstration module generally includes a protective casing, a communications port for electronically coupling the demonstration module to the vehicle navigation system, one or more electronic memory devices for storing electronic instructions and a plurality of navigation demonstrations, and an electronic processing device for executing the electronic instructions. Execution of the electronic instructions causes the vehicle navigation system to play one or more of the navigation demonstrations, without activating the system at a back-end facility.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The demonstration method and module disclosed herein are used to demonstrate various features of a vehicle navigation system without activating the system at a back-end facility, such as a call center. Oftentimes when selling a vehicle, it is helpful to provide a potential customer with an in-vehicle demonstration of the various features of the vehicle navigation system, such as turn-by-turn directions, even though the system has not been activated and therefore is unable to provide telematics-based services. Furthermore, it is helpful if those demonstrations involve local, regional, or otherwise familiar settings so that the customer can relate with the landmarks, routes, points-of-interest, etc. that are being referenced.

Figure 1:
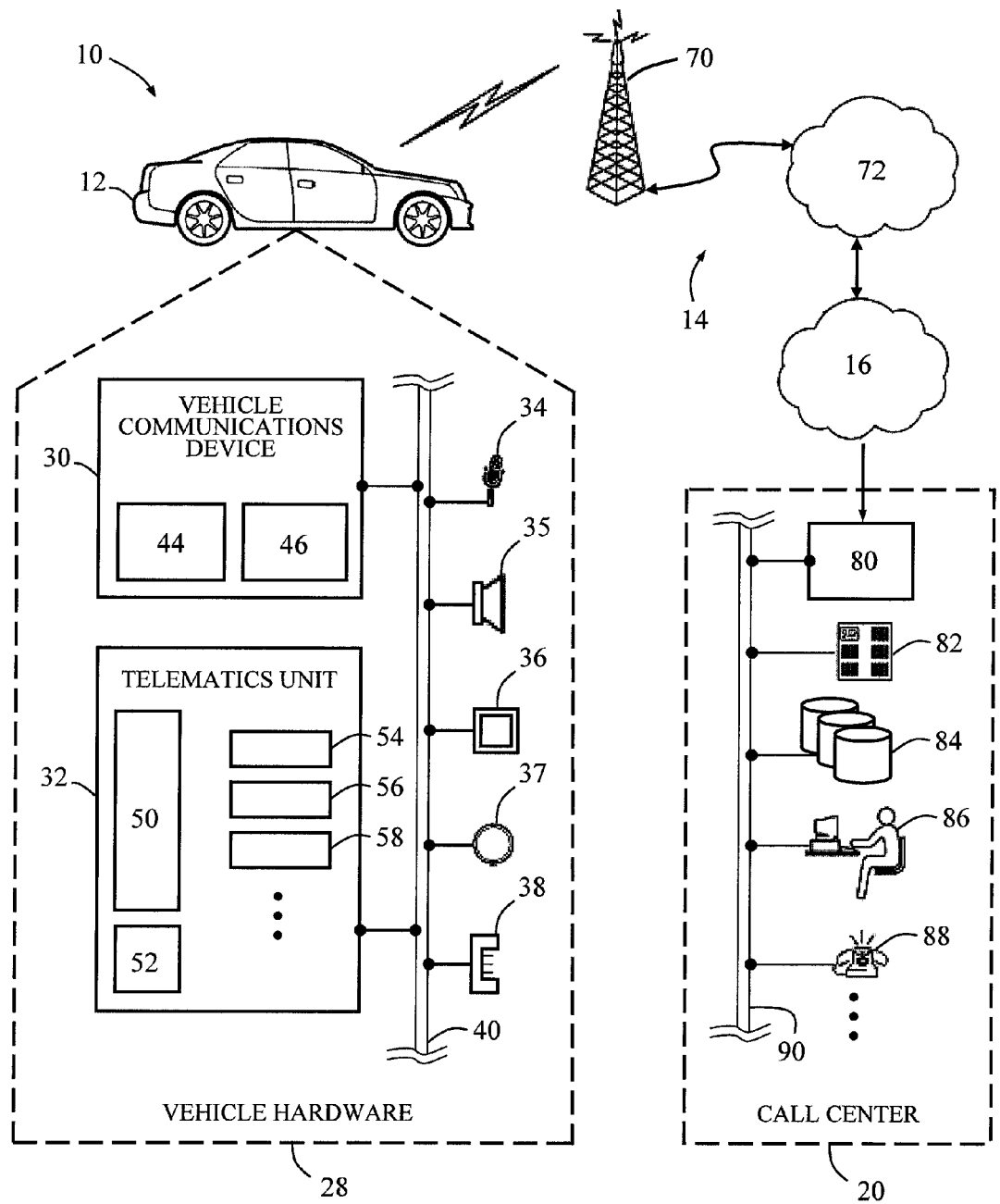
FIG. 1 is a block diagram depicting an exemplary embodiment of a communications system that is capable of utilizing the demonstration method disclosed herein.

With reference to FIG. 1, there is shown an example of a communications system 10 that is capable of providing telematics-based vehicle navigation services, like turn-by-turn directions, and generally includes a vehicle 12, a wireless carrier system 14, a land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the disclosed method as well.

Vehicle 12 is preferably a mobile vehicle such as a motorcycle, car, truck, recreational vehicle (RV), boat, plane, etc., and is equipped with suitable hardware and software that enables it to communicate over system 10 and provide telematics-based services. Some of the vehicle hardware 28 is shown generally in FIG. 1 and includes a vehicle communication device 30, a telematics unit 32, a microphone 34, a speaker 35, a display 36, buttons and/or controls 37, and a network port 38, all of which are interconnected using a network connection or bus 40. Examples of suitable network connections include a controller area network (CAN), a media oriented system transfer (MOST), a local interconnection network (LIN), an Ethernet network, and other appropriate connections such as those that conform with known ISO, SAE and IEEE standards and specifications, to name but a few. Examples of suitable network ports 38 include OBD-I, OBD-II (SAE J1962), and ALDL ports, however, other network ports known in the art could be used as well.

Vehicle communication device 30 preferably uses radio transmissions to establish a connection with wireless carrier system 14 so that both voice and data transmissions can be sent and received. By providing both voice and data communication, vehicle communication device 30 enables the vehicle to offer a number of different services including those related to navigation, telephony, emergency assistance, diagnostics, infotainment, etc. According to one embodiment, vehicle communication device 30 includes a standard cellular chipset 44 for voice communications and a modem 46 for data transmission. For a more complete discussion of data transmission over a voice channel, please refer to U.S. patent application Ser. No. 11/163,579 filed Oct. 24, 2005, which is assigned to the present assignee and is hereby incorporated by reference.

Telematics unit 32 is an onboard device that provides a variety of services through its communication with call center 20, and generally includes an electronic processing device 50, one or more types of electronic memory 52 and a number of function-specific devices or modules 54-58. While in communication with call center 20, telematics unit 32 can provide a variety of different services including, for example: navigation-related services provided in conjunction with a vehicle navigation system 54 having a GPS receiver; airbag deployment notification and other emergency or roadside assistance-related services provided in connection with various sensors 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable telematics unit that can provide the above-identified services and can be used to implement the demonstration method subsequently described is known to those skilled in the art.

Microphone 34 provides the driver or other vehicle occupant with a means for communicating and inputting verbal or other auditory commands, and can be equipped with an embedded voice processing unit utilizing human/machine interface (HMI) technology known in the art. Conversely, speaker 35 provides verbal output to the vehicle occupants and can either be a stand-alone speaker specifically dedicated for use with telematics unit 32 or it can be part of the vehicle audio system. In any case, microphone 34 and speaker 35 enable vehicle hardware 28 and call center 20 to communicate with the occupants through audible speech, such as during the provision of turn-by-turn directions. Display 36 provides the occupants with visual cues or information through devices such as a graphical Vacuum Fluorescent Display, a heads-up-display (HUD), a graphical user interface (GUI), a driver information center (DIC), or other output devices located within the vehicle. The vehicle hardware also includes one or more buttons or controls 37 for enabling a vehicle occupant to activate or engage one or more of the vehicle hardware components 28. For instance, controls 37 can include various electronic push-buttons, dials, knobs, switches, etc., such as those that are mounted on the steering wheel, steering column or instrument panel and are used to initiate one or more electronic components within the vehicle, including the demonstration module disclosed in FIGS. 2 and 3.

Wireless carrier system 14 is preferably a cellular telephone system or any other suitable wireless system that transmits signals between the vehicle hardware 28 and land network 16. According to an exemplary embodiment, wireless carrier system 14 includes one or more cell towers 70, base stations and/or mobile switching centers (MSCs) 72, as well as any other networking components required to connect the wireless system 14 with land network 16. Land network 16 can be a conventional land-based telecommunications network that is connected to one or more landline telephones and connects wireless carrier network 14 to call center 20. For example, land network 16 can include a public switched telephone network (PSTN) and/or an Internet Protocol (IP) network, as is appreciated by those skilled in the art. Furthermore, call center 20 need not be connected via land network 16, but could include wireless telephony equipment so that it can communicate directly with wireless network 14.

According to the exemplary embodiment shown here, call center 20 generally includes one or more switches 80, servers 82, databases 84, live advisors 86, as well as a variety of other telecommunication and computer equipment 88 that is known to those skilled in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. Data transmission may also be conducted by wireless systems, such as, for example 802.11x, GPRS, and the like. Database 84 could be designed to store subscriber profile records, subscriber behavioral patterns, or any other pertinent subscriber information. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Call center 20 provides the vehicle with a number of back-end support functions that enable a variety of telematics-based services. According to some arrangements, the call center only supports telematics-based services for users who have activated their system, registered their account, or otherwise subscribed to certain services. For example, a user can request turn-by-turn directions to a particular destination by pressing one of the controls 37, which initiates a wireless voice and/or data connection between the vehicle hardware 28 and call center 20. Initially, database 84 at the call center verifies that the subscriber is authorized to receive turn-by-turn driving instructions. If successfully verified, the call center uses the subscriber's current location and desired destination to generate turn-by-turn driving instructions, which are then sent to the vehicle hardware 28. Once received, the vehicle hardware conveys the driving instructions to the user through speaker 35, display 36, and/or some other output device. If the call center is unable to verify proper subscription for the turn-by-turn directions being requested, then it alerts the user that they are not currently registered for such services and asks them if they would like to activate them. This is, of course, only a summary of one method for verifying activation of a system or account, as other methods could alternatively be used.

Figure 2:
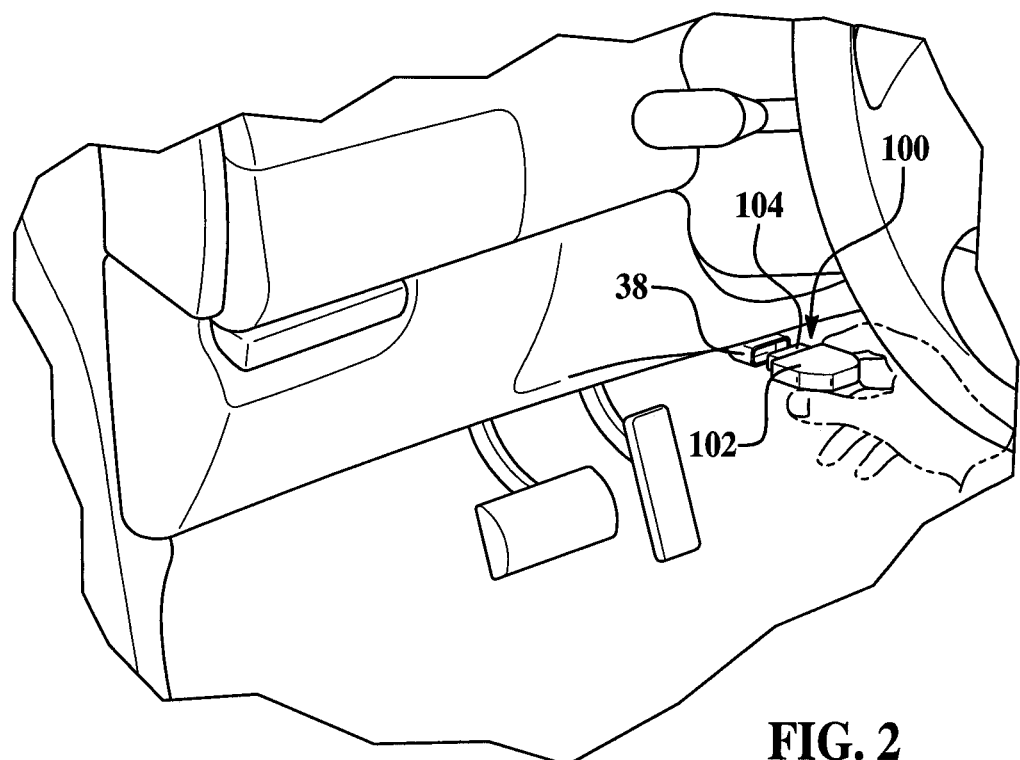
FIG. 2 is a perspective view of a section of a vehicle interior cabin, where an exemplary embodiment of a demonstration module is shown being connected with a vehicle network port.
Figure 3:
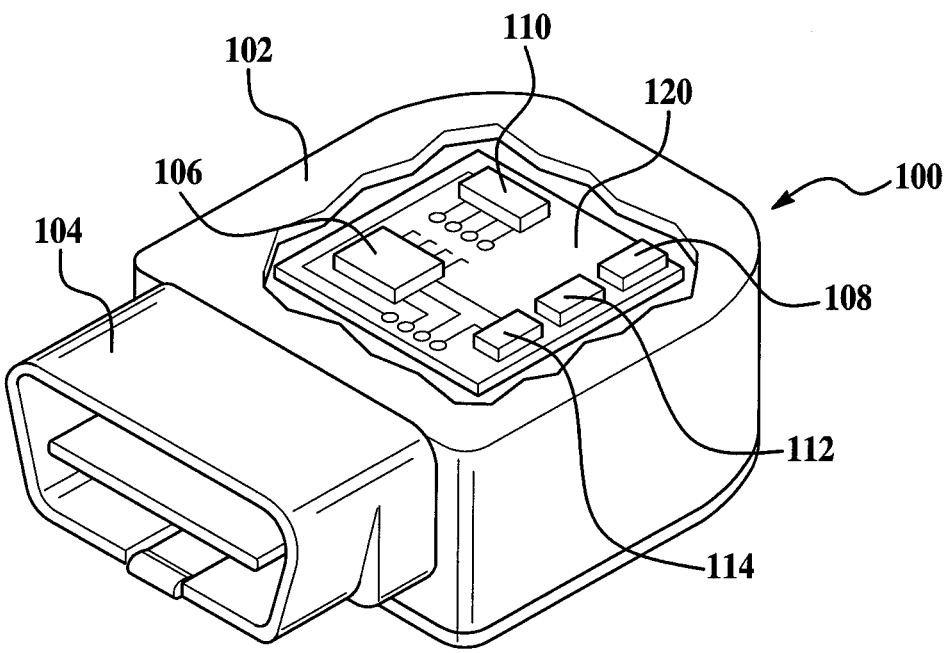
FIG. 3 is a perspective, cutaway view of the demonstration module of FIG. 2.

With reference to FIGS. 2 and 3, there is shown an embodiment of a small, portable electronic demonstration module 100 that stores a number of pre-established navigation demonstrations (also called navigation experiences), and generally includes a protective casing 102, a communications port 104, and a number of electronic components 106-114 mounted on a circuit board 120. Protective casing 102 is generally a rectangular housing made of a hard plastic or other suitable material and, as its name suggests, is designed to protect the electronic components of the module. As best shown in FIG. 2, module 100 preferably includes a communications port 104 that detachably connects with the network port 38 on the vehicle so that the module is electronically coupled with one or more vehicle hardware components 28, including the vehicle navigation system. Depending on the particular arrangement, communications port 104 can transmit data and/or power between the various vehicle hardware components and the module. Although communications port 104 can be one of a variety of different types of physical connections, such as OBD-I, OBD-II (SAE J1962) and ALDL-type connections, it should be appreciated that port 104 could also be a wireless port for establishing a short-range wireless link with the vehicle hardware.

The electronics mounted on circuit board 120 include an electronic processing device 106, an input/output device 108, a battery or other energy storage device 110, and a computer readable memory devices 112, 114. Processing device 106 can be, for example, a microprocessor or microcontroller that executes computer program instructions saved on the module so that a selected navigation demonstration is sent to and played on one or more vehicle output devices, as will be explained in more detail. Input/output device 108 is a communications component that enables demonstration module 100 to communicate with a number of different devices, networks and/or systems on the vehicle via communications port 104. Energy storage device 110 can either be a standard-type battery or, according to an embodiment where the vehicle provides module 100 with its energy, device 110 can be a rechargeable energy storage device that receives and stores a charge over communications port 104. Memory devices 112 and 114 store the software or firmware for running module 100, as well as a number of pre-established navigation demonstrations that are each directed to a particular geographic location. Any suitable memory devices can be used such as RAM, ROM, flash memory, magnetic storage, or any combination of these. Of course, the software instructions and navigation demonstrations could alternatively be stored on a single memory instead.

Figure 4:
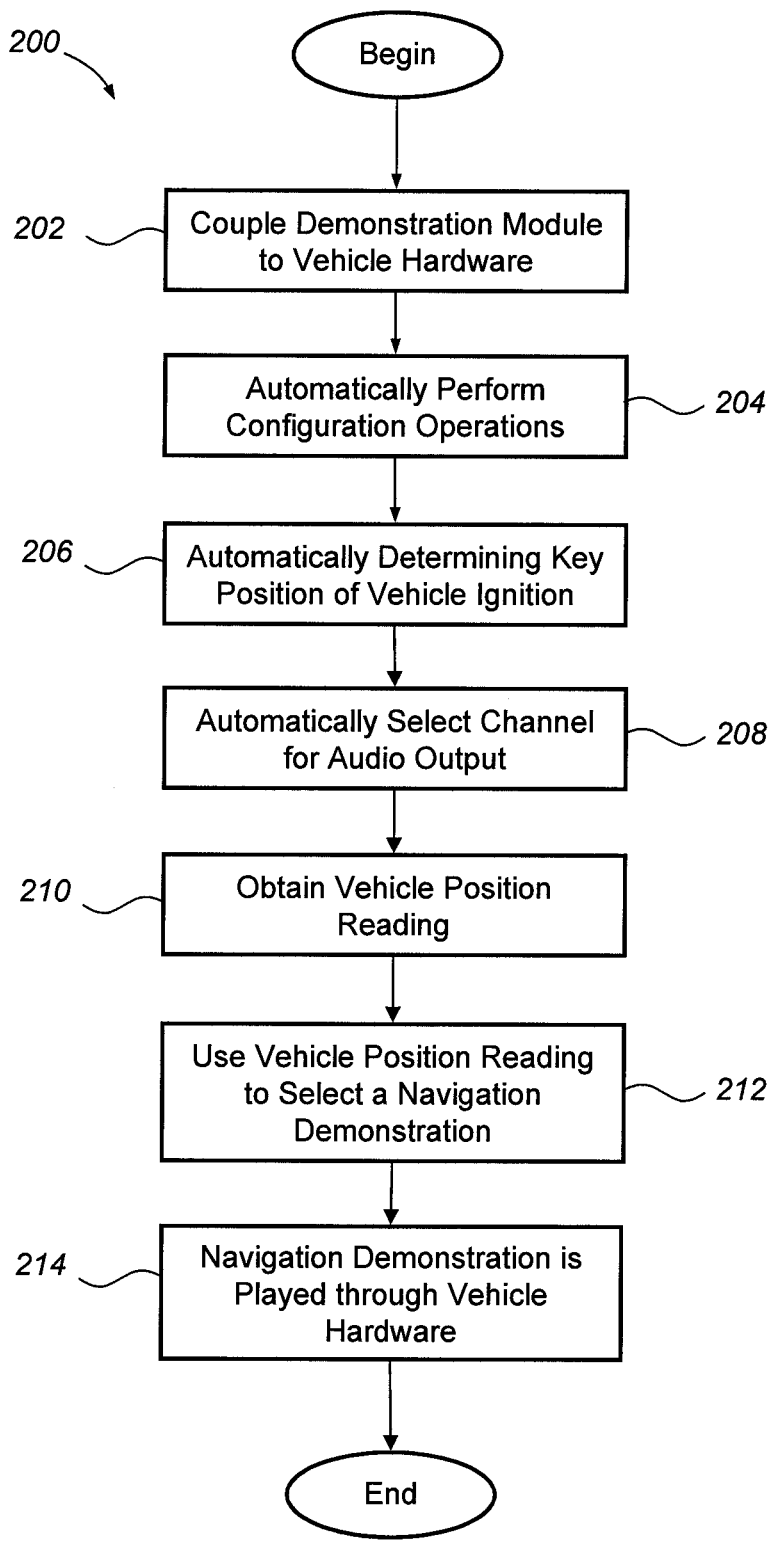
FIG. 4 is a flowchart demonstrating an embodiment of the demonstration method disclosed herein.

Turning now to FIG. 4, there is shown a flowchart illustrating an embodiment of demonstration method 200 which generally enables a prospective customer or other user to experience some of the features of a vehicle navigation system without activating the system at a back-end facility, such as call center 20. It should be appreciated that while the following description is directed to an embodiment where pre-established navigation demonstrations provide a user with turn-by-turn directions, other types of navigation and non-navigation services including telephony, emergency assistance, diagnostics and infotainment services could be demonstrated instead. It is also worth noting that the navigation demonstrations need not be stored on portable demonstration module 100, as they could alternatively be stored on one of a number of different devices. For instance, the pre-established navigation demonstrations could be written to electronic memory device 52 of the vehicle hardware when it is manufactured or programmed, or they could be stored in databases 84 located at the call center and then downloaded to the vehicle navigation system via the wireless carrier system 14, to name but a few of the possibilities.

Beginning with step 202, a salesperson or other user connects the electronic demonstration module 100 to the vehicle hardware 28 by inserting communications port 104 into network port 38, which is preferably located underneath the steering column (best shown in FIG. 2). For a wireless-type module 100 this initial connection to the vehicle could be done by turning on the module or possibly just by bringing it into the vicinity of the vehicle (e.g. into the vehicle passenger compartment). By coupling module 100 to the vehicle hardware, step 202 is making the various pre-established navigation experiences, each of which is generally directed to a geographic location, available to the vehicle navigation system. Once coupled to the vehicle hardware, demonstration module 100 automatically performs a number of configuration and hand-shaking operations with the network bus and vehicle hardware, step 204. For example, in this step, module 100 automatically determines the configuration or architecture of network bus 40 in order to use the proper protocol when communicating over the bus. Step 204 can also include an automated process where the demonstration module searches the network bus for available hardware components, such as speaker 35, display 36 and controls 37, and determines their configuration so that the module can communicate with them. Rather than searching for each of the hardware components individually, step 204 may instead acquire one or more configuration codes that provide details for the overall hardware configuration. By knowing which hardware components are available, demonstration module 100 can subsequently send the pre-established navigation demonstrations to an appropriate output device or combination of devices so that the features of the vehicle navigation system are best illustrated.

Next, step 206 automatically determines the current key position or power mode of the vehicle ignition, as well as the current position of the vehicle transmission. This could be done in various ways, such as by obtaining the vehicle ignition state and the vehicle transmission state over the network bus 40. Knowing this information enables module 100 to select a power or operational mode based on the key position. For example, the demonstration module could use the key position information to select a low power or stand-by mode while the vehicle is turned off, only to become active when the vehicle ignition is turned to an accessory or start position. It is also preferable that module 100 automatically determine the state of the vehicle transmission so that demonstration method 200 can be halted if the transmission is in 'DRIVE'. Stated differently, if module 100 determines that the vehicle transmission is in a state other than 'PARK', then the demonstration method 200 should terminate so that the driver does not misinterpret the instructions being provided by the demonstration method as actual driving instructions.

According to one embodiment, the audio components of the navigation demonstrations are played through the vehicle audio system, in which case it is preferable for module 100 to automatically select the best frequency for use, step 208. Demonstration module 100 can be equipped with additional components like a radio frequency (RF) modulator and sound system control module. First, the RF modulator is used to conduct a signal-to-noise ratio (SNR) test in order to locate the best frequency for use through the vehicle audio system. After selecting a particular frequency, the vehicle audio system is configured over network bus 40 with the selected frequency and a predetermined volume. It should be appreciated that the radio frequency could be of any type and range that the vehicle's sound system is capable of receiving, including AM, FM, and various satellite radio technologies. Furthermore, while the navigation demonstration may be capable of controlling the radio, a specific radio control module may also be employed.

In step 210, the demonstration module 100 obtains a current vehicle position reading from the vehicle navigation system. Preferably, this position reading is acquired from a GPS receiver located in the vehicle navigation system. The vehicle position information enables demonstration module 100 to select from the various pre-established navigation demonstrations, step 212, so that a navigation experience most suitable to the area of the vehicle, and hence the prospective customer, can be chosen. For example, demonstration module 100 may come with a pre-established navigation demonstration for each major metropolitan market in the United States. Thus, when the demonstration method 200 is executed, the navigation experience for the metropolitan area closest in proximity to the current position of the vehicle is played to the customer. The geographic location used by method 200 can be a specific location, such as a particular dealership or exhibition center, or it can be a city, county, state, region, country, etc. Providing local or even regional navigation demonstrations enhances the customer's experience by providing them with familiar information, such as directions to and from known landmarks, highways, points-of-interest, etc. According to another embodiment, instead of obtaining the vehicle position reading from a GPS receiver, vehicle communications device 30 queries wireless carrier system 14 for current position data.

Step 212 may also utilize the vehicle position reading from step 210 to make changes to various configuration parameters. For example, when choosing a radio frequency for playing audio components through the vehicle's audio system, the module 100 may select from a set of downloaded frequencies that are wirelessly updated from call center 20. By providing a finite number of radio frequencies that are known to be available for a certain area or region, the amount of time needed for configuration of the audio system can be reduced, as the method will avoid using frequencies that are known to be unavailable.

Once a particular navigation demonstration has been identified, the user is provided with an interactive menu so that they can play the navigation experience through one or more output devices like speaker 35 and/or display 36, step 214. In this example, the user hears audible turn-by-turn directions over speaker 35 and sees visual cues via display 36, just as if the vehicle was actually being driven and was in communication with call center 20. Once the demonstration is finished, or the user has ended the demonstration, they are returned to the interactive menu which can then provide the user with a message about different aspects of the services offered and ways in which they can be activated, etc. The interactive menu may be designed to receive voice commands through microphone 34 or it could utilize a graphical user interface through a touch-screen display 36, to name but a few options.

Demonstration module 100 can, of course, be provided with a number of additional features. For instance, module 100 could be designed so that it alerts a user if the vehicle in which the module is attached is driven away after the demonstration is finished, so that the user can return the module back to the dealership. The demonstration routes themselves can be preprogrammed in the module and/or can be downloaded to the module via a cellular or other wireless system. Also, the last known vehicle location can be stored in the telematics unit 32 and the vehicle position can be obtained by retrieving this last known location from memory and utilizing it as the current vehicle position.

It is to be understood that the foregoing description is not a description of the invention itself, but of one or more preferred exemplary embodiments of the invention. The invention is not limited to the particular embodiment(s) disclosed herein, but rather is defined solely by the claims below. For instance, it is possible for the user to instruct the system to play a navigation demonstration other than the one selected in step 212, or to skip over certain introductory or closing messages. Also, the user may select from different types of navigation demonstrations; that is, instead of selecting a navigation demonstration that illustrates the system's turn-by-turn directions feature, the user can select demonstrations that simulate the vehicle's emergency response or remote diagnostics capabilities. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for communication with a telematics-equipped vehicle comprising the steps of:
    (a) providing a plurality of pre-established navigation demonstrations, each of which is associated with a geographic location;
    (b) obtaining a vehicle position reading relating to the position of the vehicle;
    (c) selecting one of said pre-established navigation demonstrations based at least partially on said vehicle position reading; and
    (d) using one or more output device(s) to play said selected pre-established navigation demonstration and to illustrate features of a telematics-based vehicle navigation system without activating the telematics-based vehicle navigation system at a back-end facility.

2. The demonstration method of claim 1, wherein said method further includes the step of automatically determining the configuration of a network bus and one or more vehicle hardware component(s).

3. The demonstration method of claim 1, wherein said method further includes the step of automatically determining the key position of a vehicle ignition, and performing steps (b)-(d) in a power mode that is selected based on said key position.

4. The demonstration method of claim 1, wherein said method further includes the step of automatically determining the state of a vehicle transmission, and halting said method if said state is other than 'PARK'.

5. The demonstration method of claim 1, wherein said method further includes the step of automatically selecting a particular frequency, and wherein step (d) further includes playing an audio component of said selected navigation demonstration over a vehicle audio system using said selected frequency.

6. The demonstration method of claim 5, wherein said automatic selection of said frequency further includes conducting a signal-to-noise ratio (SNR) test involving a plurality of frequencies.

7. The demonstration method of claim 6, wherein said signal-to-noise ratio (SNR) test further includes receiving wireless updates of local frequency information.

8. The demonstration method of claim 1, wherein said method further includes the step of receiving wireless updates of said navigation demonstrations.

9. The demonstration method of claim 1, wherein said method further includes the step of alerting a user when an electronic module carrying said plurality of navigation demonstrations is still present in the vehicle following said demonstration.

10. The demonstration method of claim 1, wherein step (a) further includes providing said plurality of navigation demonstrations on a portable, electronic demonstration module that connects with the vehicle navigation system.

11. The demonstration method of claim 1, wherein step (a) further includes providing said plurality of navigation demonstrations on an integrated, electronic memory device that is part of the vehicle hardware.

12. The demonstration method of claim 1, wherein step (a) further includes providing navigation demonstrations that include turn-by-turn directions.

13. The demonstration method of claim 1, wherein step (b) further includes obtaining a vehicle position reading from a global positioning system (GPS) receiver located in the vehicle navigation system.

14. The demonstration method of claim 1, wherein step (d) further includes controlling said play of said selected navigation demonstration by using one or more electronic control(s) in the vehicle.

15. A method for demonstrating features of a telematics-based vehicle navigation system by providing turn-by-turn directions without activating the telematics-based vehicle navigation system at a back-end facility, comprising the steps of:
(a) providing a plurality of pre-established turn-by-turn navigation demonstrations, each of which is associated with a particular geographic location;
(b) obtaining a current vehicle position reading from a global positioning system (GPS) receiver that is part of the telematics-based vehicle navigation system;
(c) selecting one of said turn-by-turn navigation demonstrations based at least partially on said current vehicle position reading; and
(d) using one or more speaker(s) and/or display(s) to play said selected turn-by-turn navigation demonstration and to illustrate features of the telematics-based vehicle navigation system without activating the telematics-based vehicle navigation system at a back-end facility.

* * * * *